United States Patent [19]

Hinotani et al.

[11] Patent Number: 4,920,298
[45] Date of Patent: * Apr. 24, 1990

[54] FLAT FLUORESCENT LAMP FOR LIQUID CRYSTAL DISPLAY

[75] Inventors: Katsuhiro Hinotani, Shijonawate; Shunichi Kishimoto, Kaizuka; Haruhisa Kosaka, Nara; Katsumi Terada, Hirakata; Goro Hamagishi, Toyonaka, all of Japan

[73] Assignee: Sanyo Electric Co., Ltd., Moriguchi, Japan

[*] Notice: The portion of the term of this patent subsequent to Aug. 30, 2005 has been disclaimed.

[21] Appl. No.: 169,708

[22] Filed: Mar. 18, 1988

[30] Foreign Application Priority Data

Mar. 20, 1987 [JP] Japan ................... 62-66614
Mar. 20, 1987 [JP] Japan ................... 62-66616
Mar. 20, 1987 [JP] Japan ................... 62-66617
Mar. 20, 1987 [JP] Japan ................... 62-66618

[51] Int. Cl.$^5$ ............... H01J 61/35; H01J 61/42; G02F 1/13
[52] U.S. Cl. .................... 313/493; 313/610; 350/345
[58] Field of Search .............. 313/493, 584, 610; 350/345

[56] References Cited

U.S. PATENT DOCUMENTS

| | | | |
|---|---|---|---|
| 2,317,265 | 4/1943 | Foerste et al. | 313/484 |
| 3,508,103 | 4/1970 | Young | 313/493 |
| 3,858,284 | 1/1975 | Costa et al. | 313/584 X |
| 3,928,786 | 12/1975 | Campbell | 313/610 X |
| 4,117,368 | 9/1978 | Marlowe et al. | 313/422 |
| 4,174,523 | 11/1979 | Marlowe et al. | 313/422 X |
| 4,622,492 | 11/1986 | Barten | 313/610 X |
| 4,743,799 | 5/1988 | Loy | 313/610 X |
| 4,767,965 | 8/1988 | Yamano et al. | 313/493 |

FOREIGN PATENT DOCUMENTS

| | | | |
|---|---|---|---|
| 77077 | 4/1983 | European Pat. Off. | 313/634 |
| 54-90877 | 7/1979 | Japan . | |
| 54-111985 | 8/1979 | Japan . | |
| 60-188974 | 9/1985 | Japan . | |
| 208537 | 9/1987 | Japan . | |

*Primary Examiner*—Palmer C. DeMeo
*Attorney, Agent, or Firm*—Armstrong, Nikaido, Marmelstein, Kubovcik & Murray

[57] ABSTRACT

In a flat fluorescent lamp for serving as a back light of liquid crystal panels for use in display devices, upper and lower glass plates are respectively coated with fluorescent film on its inner surface and arranged in parallel to each other, a glass side wall is disposed along the peripheral edges of the upper and lower glass plates in order to form a hermetic discharge space between the upper and lower glass plates, a pair of discharge electrodes are arranged in parallel within the discharge space and opposed to each other, at least one reinforcing glass member having a height approximately equal to the distance between the upper and lower glass plates and for supporting the upper and lower glass plates is disposed between the electrodes, and the upper glass plate is formed at its inner surface with an uncoated portion having no fluorescent film at the position where the upper glass plate is opposed to the reinforcing glass member in contact therewith.

17 Claims, 8 Drawing Sheets

FIG. 7
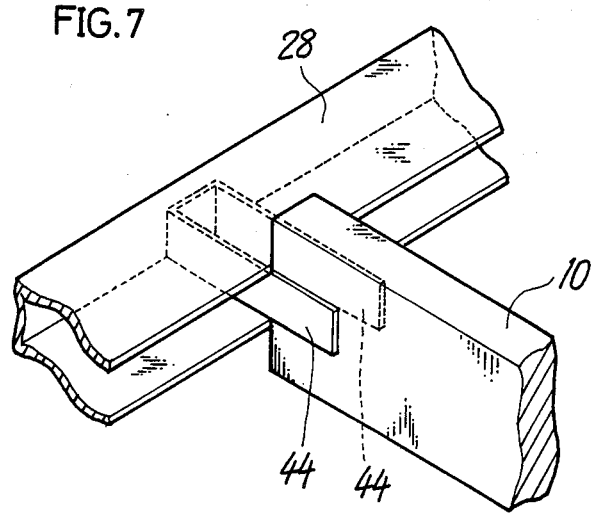
FIG. 8 FIG. 9 FIG. 10
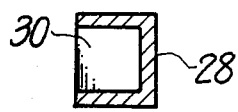 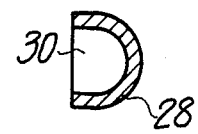 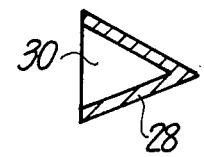
FIG. 11
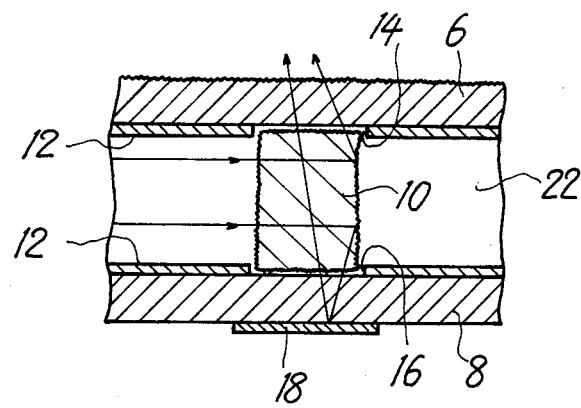

FLAT FLUORESCENT LAMP FOR LIQUID CRYSTAL DISPLAY

FIELD OF INDUSTRIAL APPLICATION

The present invention relates to flat fluorescent lamps useful as back lights for liquid crystal panels for use in liquid crystal TV receivers and liquid crystal displays for word processors or personal computers.

BACKGROUND OF THE INVENTION

Liquid crystal panels have the advantages of being lightweight, thin and low in power consumption and are therefore widely used for liquid TV receivers and also for display devices for personal computers, word processors or the like. On the other hand, liquid crystals per se do not luminesce, so that it is necessary to uniformly illuminate the liquid cyrstal panel from behind and render the liquid crystal screen easily visible, hence a need for a back light. For example, Unexamined Japanese Patent Publication No. SHO 54-90877 and Unexamined Japanese Utility Model Publication No. SHO 54-111985 disclose flat fluorescent lamps for use as back lights.

In recent years, liquid crystals of larger sizes are in use, including, for example, those of A4 size, and there is a need to use flat fluorescent lamps of increased sizes for such large-sized liquid crystal panels. With the flat fluorescent lamps disclosed in the above publications, however, the glass container, when to be made large-sized, must be prepared from a glass plate of increased thickness in order to preclude implosion due to atmospheric pressure, so that the lamp obtained becomes heavier and has an increased thickness.

To overcome this drawback, the present applicant has already proposed a lamp of the construction shown in FIG. 19 (Unexamined Japanese Patent Publication No. SHO 60-188974). The lamp includes reinforcing glass members 10 formed integrally with a lower glass plate 8 by press work for supporting an upper glass plate 6 so as to give the lamp increased resistance to pressure without increasing the thickness thereof.

Nevertheless, the proposed construction requires different molds for liquid crystal panels of different sizes and therefore has the problem of being costly.

Related Art

The present applicant has also accomplished a related invention as illustrated in FIG. 20 and disclosed in Unexamined Japanese Patent Publication No. SHO 62-208537. The lamp of the invention includes reinforcing glass members 10 adhered to an upper glass plate 6 or a lower glass plate 8 and thereby fixedly provided within the discharge space.

However, when relatively inexpensive soda glass, lead glass, borosilicate glass or the like is used for the reinforcing glass member, the glass member fails to transmit the UV rays (2537 Å) emitted from mercury by a discharge in the space. Consequently, the fluorescent film coating the inner surface of the upper glass plate does not luminesce at the portions thereof opposed to the reinforcing members to block the light, resulting in lower brightness and producing irregularities in brightness over the luminescent screen.

SUMMARY OF THE INVENTION

An object of the present invention is to provide a flat fluorescent lamp which is greatly diminished in brightness irregularities although incorporating reinforcing glass members so as to give a luminescent screen of substantially uniform brightness.

Another object of the invention is to provide an inexpensive flat fluorescent lamp of such a construction that the lamp including reinforcing glass members can be readily fabricated in altered dimensions for use as a back light for a liquid crystal panel of altered size.

The flat fluorescent lamp of the present invention is characterized in that the inner surface of the upper glass plate thereof, which is coated with a fluorescent film, is not coated with any fluorescent film at the portions thereof opposed to reinforcing glass members so as to assure the upper glass plate of substantially uniform brightness over the entire area thereof including the uncoated portions.

Further the fluorescent lamp of the present invention is characterized in that the upper and lower glass plates thereof are each made of a planar glass plate, and each reinforcing member is fixedly provided in the discharge space by being engaged at its opposite ends with respective discharge electrodes or by being adhered to the lower glass plate. Accordingly, for use with a liquid crystal panel of altered size, the lamp can be readily fabricated in a correspondingly altered size using upper and lower glass plates and side glass wall of altered dimensions and reinforcing glass members of different length without using any glass molding dies.

According to another feature of the invention, the reinforcing member itself is made of a glass having characteristics to transmit UV rays, and the upper glass plate is coated with a fluorescent film over the inner surface thereof defining a discharge space and including the portion thereof opposed to the reinforcing member so as to assure the upper glass plate of substantially uniform brightness over the luminescent panel thereof.

BRIEF DESCRIPTION OF THE DRAWINGS

FIG. 5 to FIG. 7 are perspective views showing different joints between a discharge electrode and a reinforcing glass member;

FIG. 8 to FIG. 10 are views in section showing different discharge electrodes;

FIG. 11 to FIG. 14 are sectional views showing different embodiments each comprising a reinforcing glass member and upper and lower glass plates;

DETAILED DESCRIPTION OF EMBODIMENTS

Figure 1:
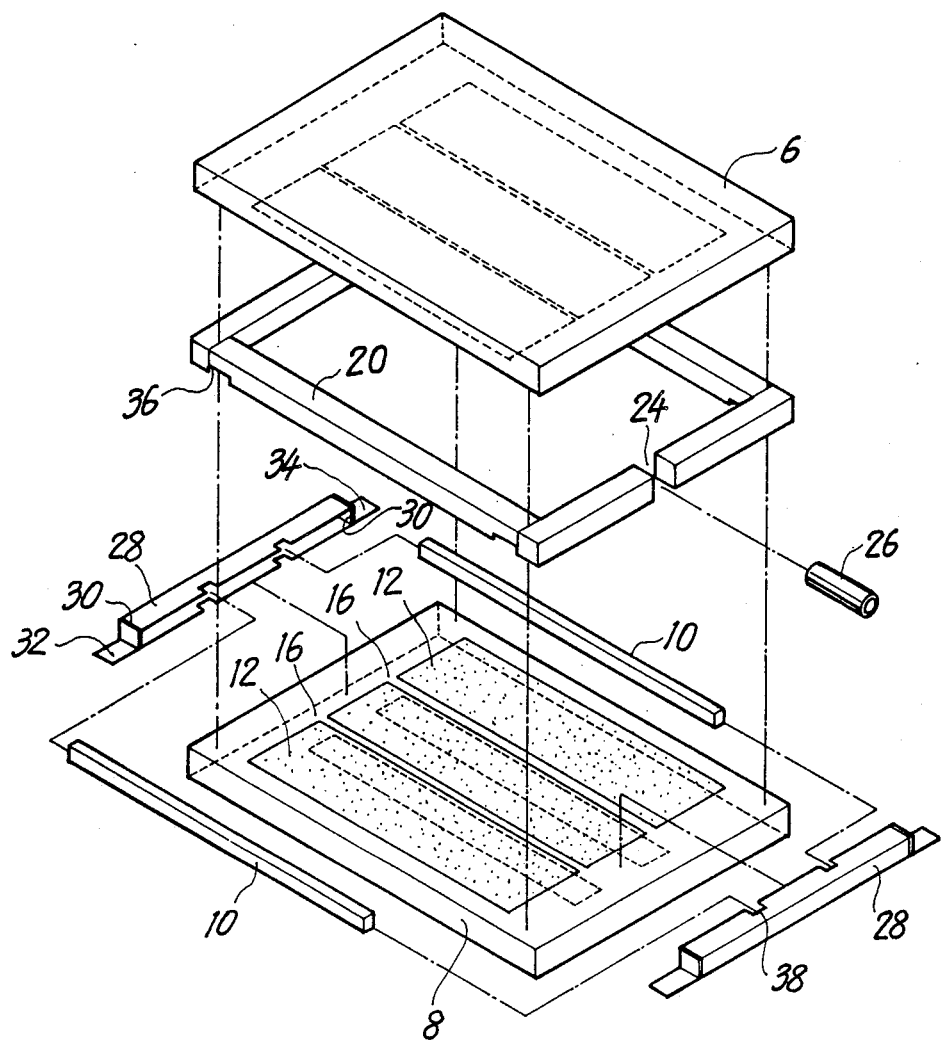
FIG. 1 is an exploded perspective view of a flat fluorescent embodying the invention.
Figure 2:
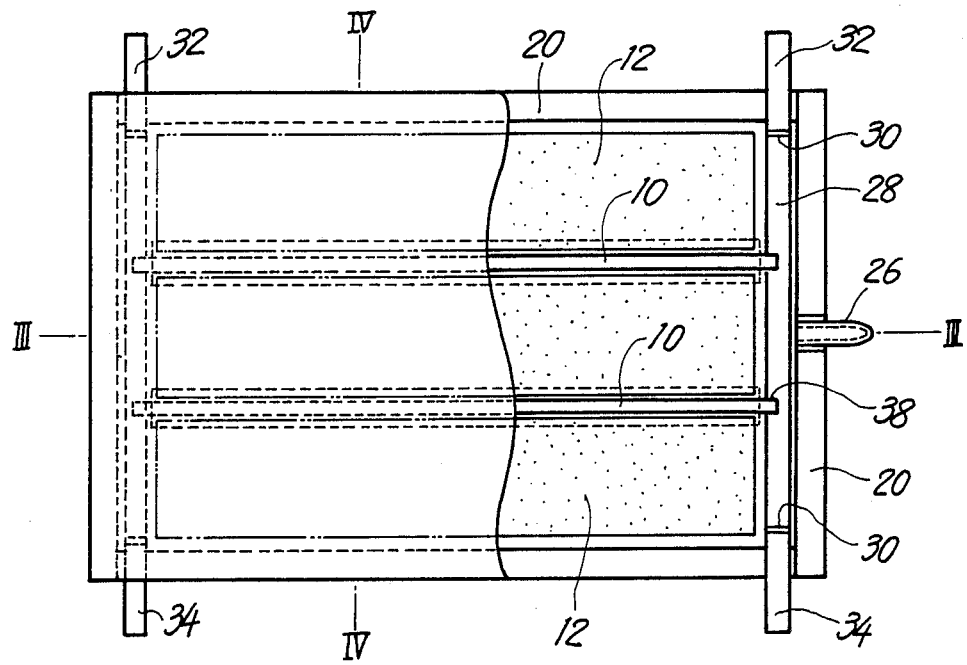
FIG. 2 is a plan view partly broken away and showing the lamp.
Figure 3:
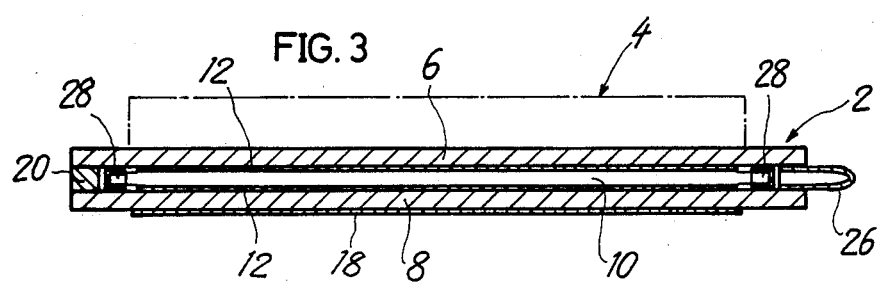
FIG. 3 is a view in section taken along the line III—III in 2.
Figure 4:
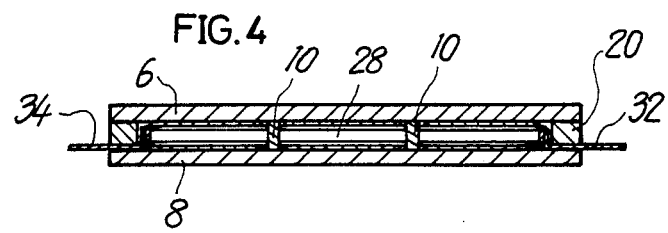
FIG. 4 is a view in section taken along the line IV—IV in FIG. 2.

FIGS. 1 to 4 show a flat fluorescent lamp 2 embodying the invention and in the form of a thin flat plate approximately of A4 size (278 mm×192 mm) with a thickness of 3 mm. The lamp has an upper surface providing a luminescent screen and is disposed in intimate contact with the rear side of a liquid crystal panel 4 to serve as a back light for the panel 4. Upper and lower flat glass plates 6 and 8 are coated with a fluorescent film 12 by screen printing over the entire inner surfaces thereof except at their outer peripheral portions and the portions thereof to be opposed to the reinforcing glass members 10 to be described later. At the portions to be exposed to the reinforcing glass members, the glass plates 6, 8 therefore have uncoated areas 14, 16 of exposed glass surface without any fluorescent film. The upper glass plate 6 is rough-surfaced over its upper side.

In corresponding relation to each of the uncoated portions 16, the lower surface of the lower glass plate 8 is provided with a reflecting film 18 made of aluminum foil or the like and having an increased width. Provided between the upper and lower glass plates 6, 8 is a glass side wall 20 which comprises four glass frame members having a small width and arranged along the edges of the plates. Alternatively, the wall 20 is a preformed rectangular frame made by joining such frame members together. The glass side wall 20 is bonded to the peripheral edges of the upper and lower glass plates 6, 8 with frit glass placed between the upper and lower ends of the wall 20 and the glass plates 6, 8 and melted by heating. The hermetic glass tube thus obtained has an interior discharge space 22 which is defined by the upper and lower glass plates 6, 8 and the side wall 20. The glass side wall has a cutout 24, and a tip tube 26 is fitted in the cutout 24 and bonded to the side wall 20 and the plates 6, 8 with frit glass hermetically. The tip tube 26 is in communication with the discharge space. The flat fluorescent lamp is produced by removing air from the interior of the glass tube through the tip tube 26, introducing argon gas and mercury into the discharge space 22 through the tube 26 and sealing off the outer end of the tip tube 26 by fusion.

A pair of discharge electrodes 28, 28 are disposed as opposed to each other within the discharge space 22 at both ends thereof. Each of the discharge electrodes 28 is recessed in cross section and is, for example, in the form of a channel (FIG. 8), semicircular (FIG. 9) or V-shaped (FIG. 9) in section. The recessed side is opposed to the other electrode. The electrode 28 is provided at each end thereof with an auxiliary electrode 30 for promoting discharge at the end portion.

L-shaped lead pieces 32, 34 are spot-welded, each at its one end, to the outer side of the respective auxiliary electrodes 30. The other end of each of the lead pieces 32, 34 is fitted in a recessed portion 36 formed in the lower side of the glass side wall 20, and is held between and bonded to the lower glass plate 8 and the side wall 20. The lead piece has its outer end projected outward to provide a current passing terminal and serves the function of fixedly supporting the discharge electrode 28 within the discharge space 22.

A plurality of slender reinforcing glass members 10 having a height approximately equal to the distance between the inner surfaces of the upper and lower glass plates 6, 8 are arranged within the discharge space 22 between the discharge electrodes 28, 28.

Each reinforcing glass member 10 has upper and lower faces in contact with the upper and lower plates 6, 8 to support the glass plates, which are thereby prevented from implosion against atmospheric pressure in spite of a high vacuum of the discharge space 22.

The reinforcing glass members 10 are arranged in coincidence with the uncoated inner surface portions 14, 16 of the upper and lower glass plates 6, 8.

The reinforcing glass members 10 can be fixedly provided in the discharge space by various means. For example, each of the members 10 may be bonded at its lower surface to the uncoated portion 16 of the lower glass plate 8 with frit glass.

Figure 5:
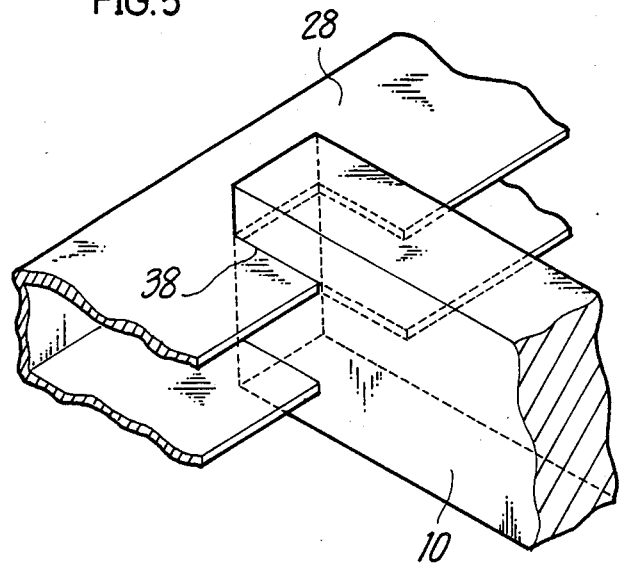

Alternatively, the end of the reinforcing glass member 10 may be fittingly engaged in a cutout 38 formed in the inner side of the discharge electrode as seen in FIG. 5.

Figure 6:
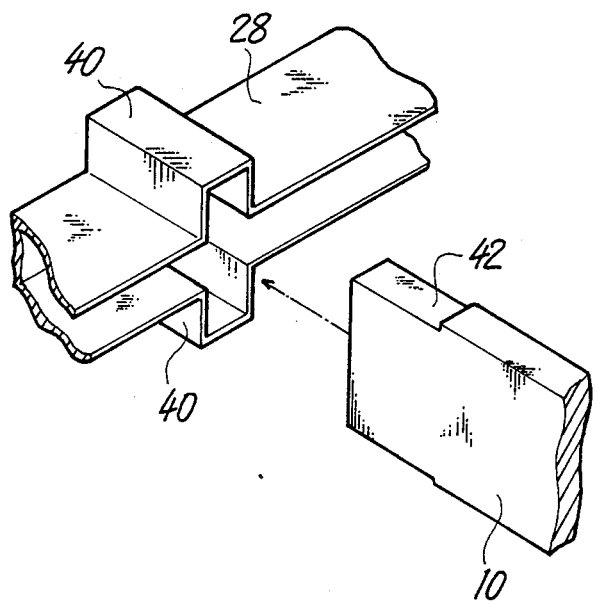

As seen in FIG. 6, the discharge electrode 28 is locally enlarged upward and downward as indicated at 40, and stepped portions 42 formed in the end of the reinforcing member are fitted in the enlarged portions.

With reference to FIG. 7, the discharge electrode 28 has a pair of parallel second auxiliary electrodes 44, between which the end of the reinforcing member is clamped in resilient engagement therewith.

The reinforcing glass member 10 is supported by being bonded to the lower glass plate or fitted to the discharge electrodes and need not be bonded to the upper glass plate 6 with frit glass. This eliminates brightness irregularities that could result, for example, from a deposit of frit glass on an undesirable portion.

FIG. 11 is an enlarged view in section showing the reinforcing glass member 10 of the present embodiment. The member 10 is positioned with its upper and lower faces opposed to the uncoated portions 14, 16 of the upper and lower glass plates 6, 8. The reflecting film 18 is provided on the lower surface of the lower glass plate 8 and is positioned in corresponding relation to the uncoated portion 16 of the plate 8. The reinforcing glass member 10 is rough-surfaced with an abrasive 7.9 to 40 $\mu$m in particle size, Accordingly, the light incident on the member 10 and directed upward upon diffused reflection at the side wall is released upward through the upper glass plate 6 at the uncoated portion 14. The light reflected downward is transmitted through the lower glass plate 8 at the uncoated portion 16, directed upward upon reflection at the reflecting film 18 and similarly released upward through the upper glass plate 6.

Consequently, of the light incident on the reinforcing glass member 10, a large amount of light is directed toward the uncoated portions 14, 16 owing to the diffused reflection at the side wall This greatly diminishes the reduction in brightness or brightness irregularities due to the use of the reinforcing glass member 10.

Furthermore, the upper glass plate 6 is similarly rough-surfaced over its upper side. Accordingly, even if the surface of the upper glass plate 6 has some difference in brightness between the portion thereof opposed to the reinforcing member 10 and the other portion, the boundary between these portions is made less distinct to inhibit brightness irregularities.

Figure 12:
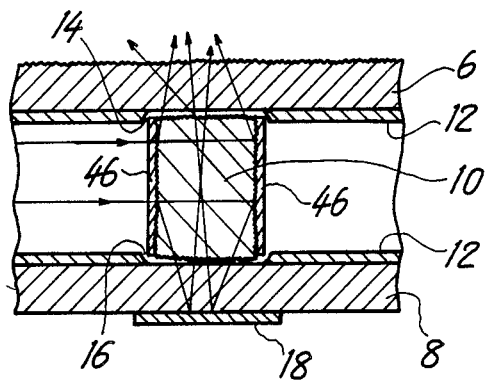

FIG. 12 shows another embodiment of reinforcing glass member 10, which is provided with a fluorescent film 46 on each side face thereof. The member 10 itself therefore luminesces, permitting an increased amount of light to be released outside through the upper glass plate 6 at the uncoated portion 14.

Figure 13:
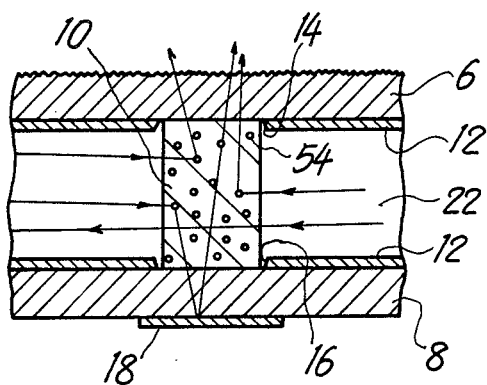

FIG. 13 shows another embodiment of reinforcing glass member 10, which is made of a milky white (translucent) glass material containing many bubbles 54 and termed multifoam glass.

The light incident on the reinforcing glass member 10 is diffusedly reflected upward and downward by the voids. The portion of light directed upward is released outward through the upper glass plate 6 at the uncoated portion 14. The portion of light directed downward is passed through the lower glass plate 8 at the lower uncoated portion 16, directed upward upon reflection at the reflecting film 18 and similarly released outward through the upper glass plate 6.

Since the reinforcing member 10 is made of multifoam glass, the incident light is diffusedly reflected in its interior, permitting an increased amount of light to be directed toward the uncoated portions 14, 16. This greatly diminishes the reduction in brightness or brightness irregularities due to the use of the reinforcing glass member 10.

Figure 14:
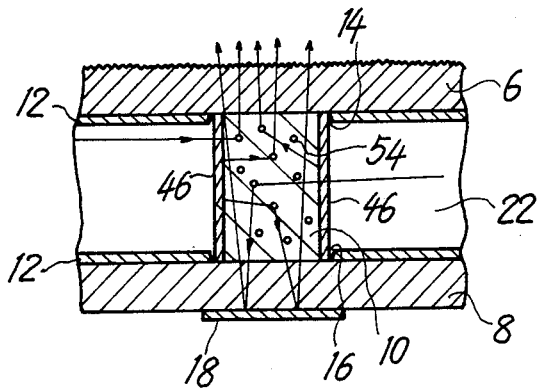

FIG. 14 shows another embodiment wherein the reinforcing member 10 of FIG. 13 made of multifoam glass is provided with a fluorescent film 46 on each side face thereof. With this embodiment, the reinforcing glass member 10 itself luminesces when exposed to UV rays, permitting an increased amount of light to be released outward through the upper glass plate 6 at the uncoated portion 14.

As another embodiment, the reinforcing glass member 10 of FIG. 11 or 12 is made of low iron glass. The low iron glass contains up to about 0.02% of $Fe_2O_3$ and exhibits in the range of visible rays high transmittance which is at a substantially definite level over this range as represented by a broken line in FIG. 15. Accordingly, this glass transmits light without causing any particular color modulation.

Apparently, the reinforcing glass member can be made of other glasses, such as quartz glass and crystal glass, which are low in $Fe_2O_3$ content and exhibiting substantially flat transmittance characteristics.

Figure 15:
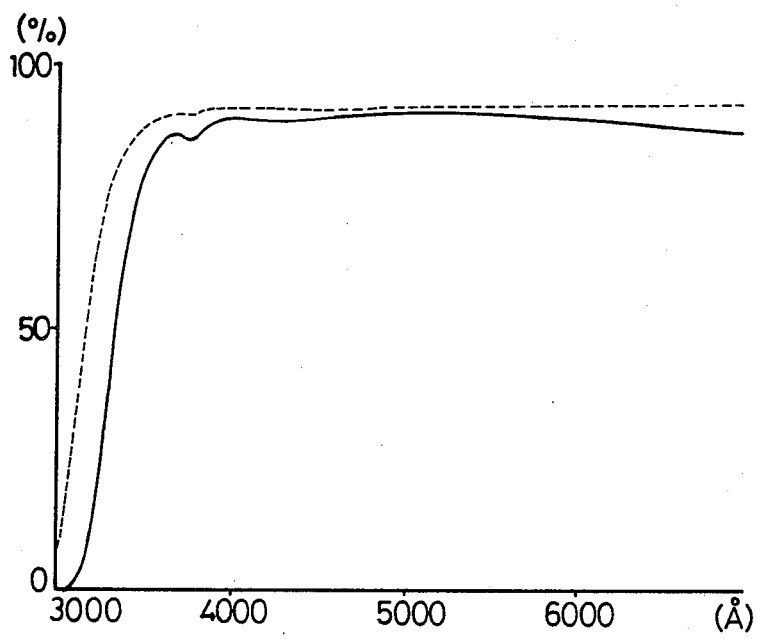
FIG. 15 is a graph showing the light transmittance characteristics of reinforcing glass members at varying wavelengths, the solid line representing those of the member of soda glass and the broken line those of the member of low iron glass.

Flat fluorescent lamps are usually prepared using relatively inexpensive soda glass. The solid line in FIG. 15 represents the transmittance characteristics of soda glass. In the range of visible rays (3800 to 6800 Å), this glass exhibits very high transmittance, which nevertheless is not completely flat or at a definite level, is highest generally for green light (4800 Å) owing to the presence of at least 0.1% of $Fe_2O_3$ and is slightly lower at the other wavelengths.

Consequently, at the portion of the luminescent screen of the lamp adjacent to the reinforcing glass member, light is transmitted after traveling through the glass over a longer distance, so that this portion is slightly lower than the other portion in brightness and produces a somewhat greenish color.

The use of the lamp as a back light for liquid crystal color displays therefore involves the problem that the display screen is locally irregular in brightness and exhibits a color modulation to green. However, the glass used for the present embodiment has substantially flat transmittance characteristics over the wavelenghth range of visible rays and therefore permits light to pass through the reinforcing member and the upper glass plate free of color modulation.

Figure 16:
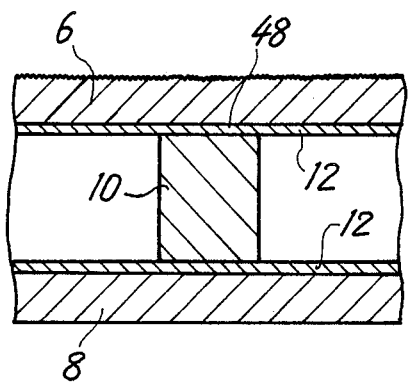
FIGS. 16 and 17 are sectional views of different embodiments each comprising a reinforcing glass member and upper and lower glass plates.

FIG. 16 shows another embodiment, wherein the reinforcing member 10 is made of a glass material, such as quartz glass, which has characteristics to transmit the UV rays emitted by the mercury in the discharge space. Each of the upper and lower glass plates is formed with a fluorescent film 48 over the entire inner surface thereof including the portion opposed to the end face of the reinforcing glass member. Thus, there is no uncoated portion.

Figure 18:
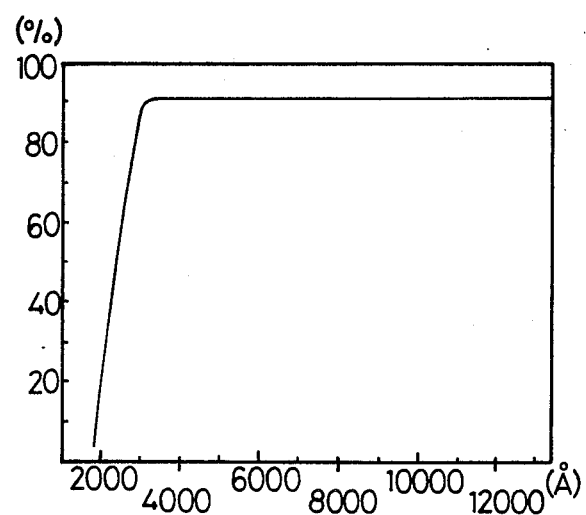
FIG. 18 is a graph showing the light transmittance characteristics of quartz glass.
Figure 19:
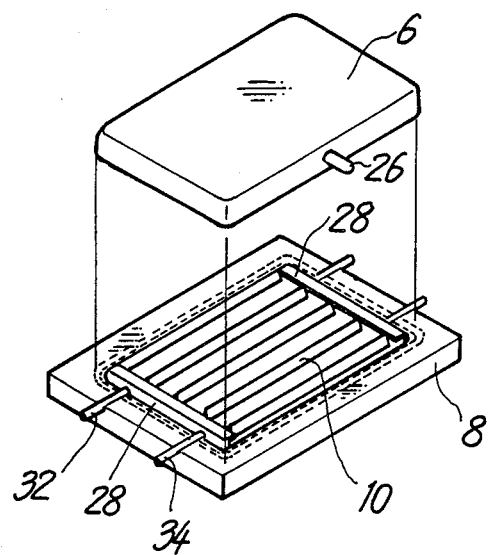
FIG. 19 is a perspective view of a known flat fluorescent lamp.
Figure 20:
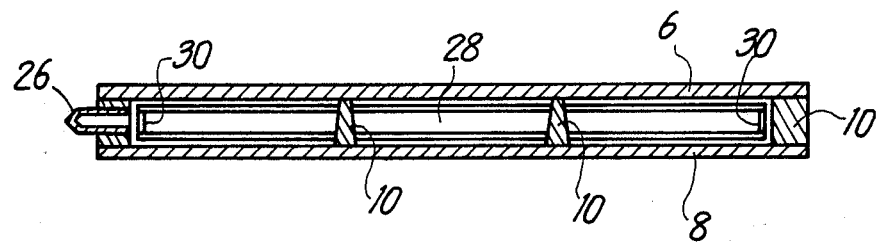
FIG. 20 a sectional view showing a flat fluorescent lamp of the related art.

FIG. 18 shows the spectral transmittance curve of the quartz glass used for the reinforcing glass member 10 of the present embodiment. Plotted as abscissa is the wavelength of light vs. the light transmittance as ordinate which is expressed in the percentage of the intensity of light transmitted through the reinforcing glass relative to the intensity of light before transmission.

As illustrated, the quartz glass transmits about 60% of UV radiation (2537 Å), the resonance line of mercury, for exciting the fluorescent material. Accordingly, the UV rays generated from mercury by a discharge within the glass tube are transmitted through the reinforcing glass member 10 and excite the fluorescent films 48 on the inner surfaces of the upper and lower glass plates at the portions thereof opposed to the reinforcing member 10, causing the portions to luminesce. This eliminates the likelihood that the luminescent screen will exhibit reduced brightness at the portion thereof adjacent to the reinforcing member 10.

Figure 17:
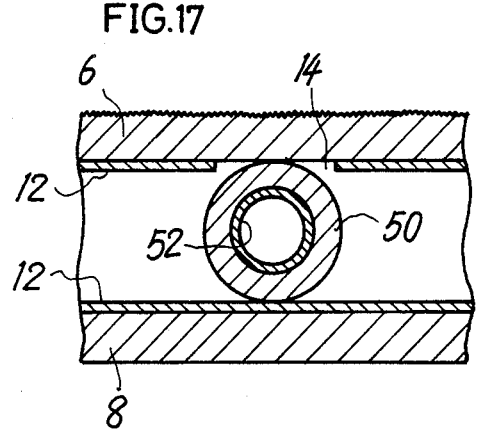

FIG. 17 is an enlarged view in section showing another reinforcing glass member 50 embodying the invention. The member 50 is prepared from quartz glass in the form of a pipe internally coated with a fluorescent film 52. The inner surface of the upper glass plate 6, which is coated with a fluorescent film 52, has an uncoated portion 14 having a width approximately equal to the diameter of the reinforcing glass member 50. The member 50 is bonded to the upper and lower glass plates with frit glass.

The UV radiation generated from mercury passes through the reinforcing member 50, exciting the fluorescent film 52 to cause the inner portion of the member 50 to luminesce. The light produced is transmitted through the reinforcing member 50 and released outward through the upper glass plate 6 at the uncoated portion 14. The light emitted by the inner portion of the member 50 passes through the uncoated portion 14 and therefore will not be blocked by the fluorescent film 12. Consequently, the reduction in brightness due to the presence of the reinforcing member 50 can be precluded.

The present invention is not limited to the embodiments herein described and illustrated in the drawings but can be otherwise embodied variously within the scope defined in the appended claims.

What is claimed is:

1. A flat fluorescent lamp for a liquid crystal panel comprising:
   a rectangular lower glass plate coated with a fluorescent film on an inner surface thereof;
   a rectangular lower glass plate coated with a fluorescent film on an inner surface thereof and disposed above the lower glass plate;
   a glass side wall disposed along peripheral edges of the upper and lower glass plates and having upper and lower end faces thereof hermetically joined to the peripheral edges of the glass plates to form a hermetic discharge space between the upper and lower glass plates;

a pair of discharge electrodes arranged in parallel within the discharge space and opposed to each other; and at least one reinforcing glass member disposed between the electrodes and for supporting the upper and lower glass plates, the reinforcing glass member having a height approximately equal to the distance between the upper and lower glass plates, wherein an inner surface of the upper glass plate has an uncoated portion having no fluorescent film at a position where the reinforcing glass member is in contact with the inner surface and further wherein the inner surface of the lower glass plate has an uncoated portion without any fluorescent film at a position where the reinforcing member is in contact with the inner surface, the lower glass plate is provided on a lower surface thereof with a reflecting film positioned corresponding to the uncoated portion thereof.

2. A flat fluorescent lamp as defined in claim 1, wherein each of the upper and lower glass plates is a planar glass sheet, and the glass side wall is a rectangular frame shaped in conformity with the contour of the upper and lower glass plates and has upper and lower end faces thereof adhered to the two glass plates.

3. A flat fluorescent lamp as defined in claim 1, wherein the upper glass plate has an upper side having a rough surface.

4. A flat fluorescent lamp as defined in claim 1, wherein the reinforcing glass member has upper and lower ends and opposite sides each having a rough surface.

5. A flat fluorescent lamp as defined in claim 1, wherein the reinforcing glass member is coated with a fluorescent film over each of opposite said surface thereof.

6. A flat fluorescent lamp as defined in claim 1, wherein the reinforcing glass member is made of translucent glass containing a multiplicity of light reflecting fine particles.

7. A flat fluorescent lamp as defined in claim 6, wherein the reinforcing glass member is made of multifoam glass having a milky white color and containing a multiplicity of fine bubbles.

8. A flat fluorescent lamp as defined in claim 1, wherein the reinforcing glass member is made of glass having flat transmittance characteristics in the wavelength range of visible rays.

9. A flat fluorescent lamp as defined in claim 8, wherein the reinforcing glass member is made of low iron glass.

10. A flat fluorescent lamp as defined in claim 1, wherein the reinforcing glass is in the form of a pipe made of a glass having characteristics capable to transmit UV rays, and the pipe is coated with a fluorescent film over an inner surface 11. A flat fluorescent lamp as defined in claim 1, wherein the reinforcing glass member is engaged at opposite ends thereof with the discharge electrodes and thereby supported within the discharge space.

12. A flat fluorescent lamp as defined in claim 1, wherein the reinforcing glass member is adhered at a lower end face thereof to the lower glass plate with frit glass.

13. A flat fluorescent lamp as defined in claim 1, wherein each of the discharge electrodes is in the form of a channel or has a circular-arc or V-shaped cross section, and is recessed at one side thereof opposed to the other discharge electrode.

14. A flat fluorescent lamp as defined in claim 11, wherein each of the discharge electrodes is formed with a cutout having fitted therein the end of the reinforcing glass member to support the reinforcing member within the discharge space.

15. A flat fluorescent lamp as defined in claims 11, wherein each of the discharge electrodes is formed with an enlarged recessed portion having fitted therein the end of the reinforcing glass member to support the reinforcing member within the discharge space.

16. A flat fluorescent lamp as defined in claims 11, wherein each of the discharge electrodes is provided with a pair of parallel auxiliary electrodes projecting therefrom and having the end of the reinforcing glass member clamped therebetween to support the reinforcing member within the discharge space.

17. A flat fluorescent lamp for a liquid crystal panel comprising:

a rectangular lower glass plate coated with a fluorescent film on an inner surface thereof;

a rectangular upper glass plate coated with a fluorescent film on an inner surface thereof and disposed above the lower glass plate in opposed relation thereto;

a glass side wall disposed along peripheral edges of the upper and lower glass plates and having upper and lower end faces thereof hermetically joined to the peripheral edges of the glass plates to form a hermetic discharge space between the upper and lower glass plates;

a pair of discharge electrodes arranged in parallel within the discharge space and opposed to each other; and at least one separate reinforcing glass member disposed between the electrodes and having ah eight approximately equal to the distance between the upper and lower glass plates, the separate reinforcing glass member being made of a glass having characteristics to transmit UV rays and being provided between the upper and lower glass plates without using any adhesive at least at the portion thereof opposed to the upper glass plate to support the two glass plates, the fluorescent film on the upper glass plate being formed over the substantially entire inner surface thereof defining the discharge space and including the portion thereof opposed to the reinforcing glass member.

* * * * *